United States Patent
Kim et al.

(10) Patent No.: US 9,990,162 B2
(45) Date of Patent: Jun. 5, 2018

(54) MEMORY CONTROLLERS, OPERATING METHODS THEREOF, AND MEMORY SYSTEMS INCLUDING THE SAME

(71) Applicant: Samsung Electronics Co., Ltd., Suwon-si, Gyeonggi-do (KR)

(72) Inventors: Ji-soo Kim, Seongnam-si (KR); Yoo-chan Kim, Seoul (KR); Moon-sang Kwon, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 123 days.

(21) Appl. No.: 14/957,807

(22) Filed: Dec. 3, 2015

(65) Prior Publication Data

US 2016/0191235 A1    Jun. 30, 2016

(30) Foreign Application Priority Data

Dec. 30, 2014    (KR) .......................... 10-2014-0193688

(51) Int. Cl.
| | |
|---|---|
| *G06F 21/00* | (2013.01) |
| *G06F 3/06* | (2006.01) |
| *H04L 9/08* | (2006.01) |

(52) U.S. Cl.
CPC .......... *G06F 3/0679* (2013.01); *G06F 3/0622* (2013.01); *G06F 3/0653* (2013.01); *H04L 9/0866* (2013.01)

(58) Field of Classification Search
USPC ........................................................ 713/193
See application file for complete search history.

(56) References Cited

U.S. PATENT DOCUMENTS

| | | | |
|---|---|---|---|
| 6,928,551 B1 | 8/2005 | Lee et al. | |
| 7,512,812 B2 | 3/2009 | Sohn | |
| 7,679,133 B2 | 3/2010 | Son et al. | |
| 7,702,920 B2 | 4/2010 | Okamoto | |
| 7,925,895 B2 | 4/2011 | Kanazawa et al. | |
| 8,553,466 B2 | 10/2013 | Han et al. | |
| 8,559,235 B2 | 10/2013 | Yoon et al. | |
| 8,639,928 B2 | 1/2014 | Bursell | |
| 8,650,654 B2 | 2/2014 | Kudoh et al. | |
| 8,654,587 B2 | 2/2014 | Yoon et al. | |
| 2007/0101158 A1* | 5/2007 | Elliott ................ G06F 12/1408 | 713/193 |
| 2008/0072071 A1 | 3/2008 | Forehand et al. | |
| 2009/0049307 A1* | 2/2009 | Lin ........................ G06F 21/72 | 713/185 |
| 2009/0196417 A1 | 8/2009 | Beaver et al. | |

(Continued)

FOREIGN PATENT DOCUMENTS

JP          2012084043 A        4/2012

*Primary Examiner* — Jason Lee
(74) *Attorney, Agent, or Firm* — Harness, Dickey & Pierce, P.L.C.

(57) ABSTRACT

An operating method of a memory controller may include: enabling a security mode in response to a first command received from a host; generating a security key based on a host key received from the host; storing the security key in a security key storing unit; and/or performing a first data processing operation of encrypting data received from the host and decrypting data stored in a non-volatile memory device, based on the security key, when the security mode is enabled. The security key storing unit may be a volatile memory.

19 Claims, 16 Drawing Sheets

(56) References Cited

U.S. PATENT DOCUMENTS

| | | |
|---|---|---|
| 2010/0011226 A1 | 1/2010 | Inagaki et al. |
| 2011/0233648 A1 | 9/2011 | Seol et al. |
| 2012/0030463 A1 | 2/2012 | Li et al. |
| 2012/0198242 A1* | 8/2012 | Dalzell .................. G06F 21/55 713/190 |
| 2015/0006911 A1* | 1/2015 | Cochran ............... G06F 21/604 713/193 |

* cited by examiner

MEMORY CONTROLLERS, OPERATING METHODS THEREOF, AND MEMORY SYSTEMS INCLUDING THE SAME

CROSS-REFERENCE TO RELATED APPLICATION(S)

This application claims priority from Korean Patent Application No. 10-2014-0193688, filed on Dec. 30, 2014, in the Korean Intellectual Property Office (KIPO), the entire contents of which are incorporated herein by reference.

BACKGROUND

1. Field

Some example embodiments of the inventive concepts may relate generally to memory controllers. Some example embodiments of the inventive concepts may relate generally to memory systems including such memory controllers. Some example embodiments of the inventive concepts may relate generally to memory controllers supporting self-encryption. Some example embodiments of the inventive concepts may relate generally to operating methods of memory controllers. Some example embodiments of the inventive concepts may relate generally to memory systems including such memory controllers.

2. Description of Related Art

The term "non-volatile memory" may refer to kinds of memory capable of retaining stored data even if a power supply is shut off. In recent years, data storages including high-capacity non-volatile memories may be widely employed and may be usefully adopted to store or transfer large amounts of data.

As capacities of data storages have gradually increased and as the portability of the data storages has improved, there may be growing likelihood that the data storages will be misused as units for secretly transferring vast amounts of data. In particular, manufacturers, state organizations, and financial institutions using information that needs security may require measures for preventing the information from being taken out by using the data storages.

In some example embodiments, a three-dimensional (3D) memory array may be provided. The 3D memory array may be monolithically formed in one or more physical levels of arrays of memory cells having an active area above a silicon substrate, and circuitry associated with the operation of those memory cells, whether such associated circuitry is above or within such substrate. The term "monolithic" means that layers of each level of the array may be directly deposited on the layers of each underlying level of the array.

In some example embodiments, the 3D memory array may include vertical NAND (VNAND) strings that are vertically oriented such that at least one memory cell is located over another memory cell. The at least one memory cell may comprise a charge trap layer.

The following patent documents, the entire contents of which are incorporated herein by reference, describe suitable configurations for three-dimensional memory arrays, in which the three-dimensional memory array may be configured as a plurality of levels, with word lines and/or bit lines shared between levels: U.S. Pat. No. 7,679,133 B2; U.S. Pat. No. 8,553,466 B2; U.S. Pat. No. 8,559,235 B2; U.S. Pat. No. 8,654,587 B2; and U.S. Patent Publication No. 2011/0233648 A1.

SUMMARY

Some example embodiments of the inventive concepts may provide methods of controlling non-volatile memory devices.

Some example embodiments of the inventive concepts may provide memory controllers performing methods of controlling non-volatile memory devices.

Some example embodiments of the inventive concepts may provide memory systems including memory controllers performing methods of controlling non-volatile memory devices.

Some example embodiments of the inventive concepts may provide methods of storing data in non-volatile memory devices by using self-encryption or reading data stored in the non-volatile memory devices.

Some example embodiments of the inventive concepts may provide memory controllers performing methods of storing data in non-volatile memory devices by using self-encryption or reading data stored in the non-volatile memory devices.

Some example embodiments of the inventive concepts may provide memory systems including memory controllers performing methods of storing data in non-volatile memory devices by using self-encryption or reading data stored in the non-volatile memory devices.

In some example embodiments, an operating method of a memory controller may comprise: enabling a security mode in response to a first command received from a host; generating a security key based on a host key received from the host; storing the security key in a security key storing unit; and/or performing a first data processing operation of encrypting data received from the host and decrypting data stored in a non-volatile memory device, based on the security key, when the security mode is enabled. The security key storing unit may be a volatile memory.

In some example embodiments, the generating of the security key may comprise: reading a characteristic key from a characteristic key storing unit; and/or generating the security key based on the host key and the characteristic key. The characteristic key storing unit may be a non-volatile memory.

In some example embodiments, the operating method may further comprise: performing a second data processing operation of encrypting data received from the host; and/or decrypting the data stored in the non-volatile memory device, based on the characteristic key, when the security mode is not enabled.

In some example embodiments, the security key may be generated by mapping the host key and the characteristic key to the security key based on a desired function. An entropy of the security key may be greater than or equal to an entropy of each of the host key and the characteristic key.

In some example embodiments, the operating method may further comprise: changing a value of the characteristic key stored in the characteristic key storing unit in response to a second command received from the host.

In some example embodiments, the operating method may further comprise: monitoring power that is supplied to a memory system comprising the non-volatile memory device; and/or sanitizing the security key storing unit when an abnormality of the power is sensed.

In some example embodiments, the host key may be received from the host together with the first command.

In some example embodiments, the operating method may further comprise: transmitting a message, which requests the host key, to the host when the security mode is enabled.

In some example embodiments, a memory system may comprise: a non-volatile memory device; and/or a memory controller configured to control the non-volatile memory device. The memory controller may comprise: a control unit configured to enable a security mode in response to a first command received from a host; a security key generating unit configured to generate a security key based on a host key received from the host; a security key storing unit configured to store the security key in a volatile manner; and/or a data processing unit configured to encrypt data received from the host and decrypt data stored in the non-volatile memory device, based on the security key, when the security mode is enabled.

In some example embodiments, the memory controller may further comprise a power monitor configured to sense abnormality of power supplied to the memory controller. The control unit may be further configured to sanitize the security key storing unit when the power monitor senses the abnormality of the power.

In some example embodiments, the data processing unit may be further configured to omit encryption of the data received from the host and decryption of the data stored in the non-volatile memory device when the security mode is not enabled.

In some example embodiments, the memory controller may further comprise a characteristic key storing unit configured to store a characteristic key in a volatile manner. The security key generating unit may be further configured to generate the security key based on the host key and the characteristic key.

In some example embodiments, when the security mode is not enabled, the data processing unit may be configured to encrypt the data received from the host and may be configured to decrypt the data stored in the non-volatile memory device, based on the characteristic key.

In some example embodiments, the control unit may be further configured to manage first and second areas of the non-volatile memory device which do not overlap each other. The security key storing unit may be further configured to store, in the volatile manner, first and second security keys generated based on first and second host keys received from the host. When the security mode is enabled, the data processing unit may be further configured to decrypt data stored in the first area, based on the first security key, and may be further configured to decrypt data stored in the second area, based on the second security key.

In some example embodiments, the characteristic key storing unit may be further configured to store the first and second characteristic keys in a non-volatile manner. When the security mode is not enabled, the data processing unit may be further configured to decrypt the data stored in the first area, based on the first characteristic key, and may be further configured to decrypt the data stored in the second area, based on the second characteristic key.

In some example embodiments, an operating method of a memory controller that includes a volatile memory and a non-volatile memory may comprise: enabling a security mode in response to a first command received from a host; generating a security key based on a host key received from the host; storing the security key in the volatile memory; and/or encrypting data received from the host, based on the security key, when the security mode is enabled.

In some example embodiments, the operating method may further comprise: storing the encrypted data in the non-volatile memory.

In some example embodiments, the generating of the security key may comprise: reading a characteristic key from the non-volatile memory; and/or generating the security key based on the host key and the characteristic key.

In some example embodiments, the operating method may further comprise: encrypting the data received from the host, based on the characteristic key, when the security mode is not enabled.

In some example embodiments, the operating method may further comprise: decrypting data stored in the non-volatile memory, based on the characteristic key, when the security mode is not enabled.

In some example embodiments, the operating method may further comprise: changing a value of the characteristic key in response to a second command received from the host.

In some example embodiments, an operating method of a memory controller that includes a volatile memory and a non-volatile memory may comprise: enabling a security mode in response to a first command received from a host; generating a security key based on a host key received from the host; storing the security key in the volatile memory; and/or decrypting data stored in the non-volatile memory, based on the security key, when the security mode is enabled.

In some example embodiments, the operating method may further comprise: encrypting data received from the host, based on the security key, when the security mode is enabled.

In some example embodiments, the generating of the security key may comprise: reading a characteristic key from the non-volatile memory; and/or generating the security key based on the host key and the characteristic key.

In some example embodiments, the operating method may further comprise: encrypting data received from the host, based on the characteristic key, when the security mode is not enabled.

In some example embodiments, the operating method may further comprise: decrypting the data stored in the non-volatile memory, based on the characteristic key, when the security mode is not enabled.

In some example embodiments, the operating method may further comprise: changing a value of the characteristic key in response to a second command received from the host.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Figure 1:
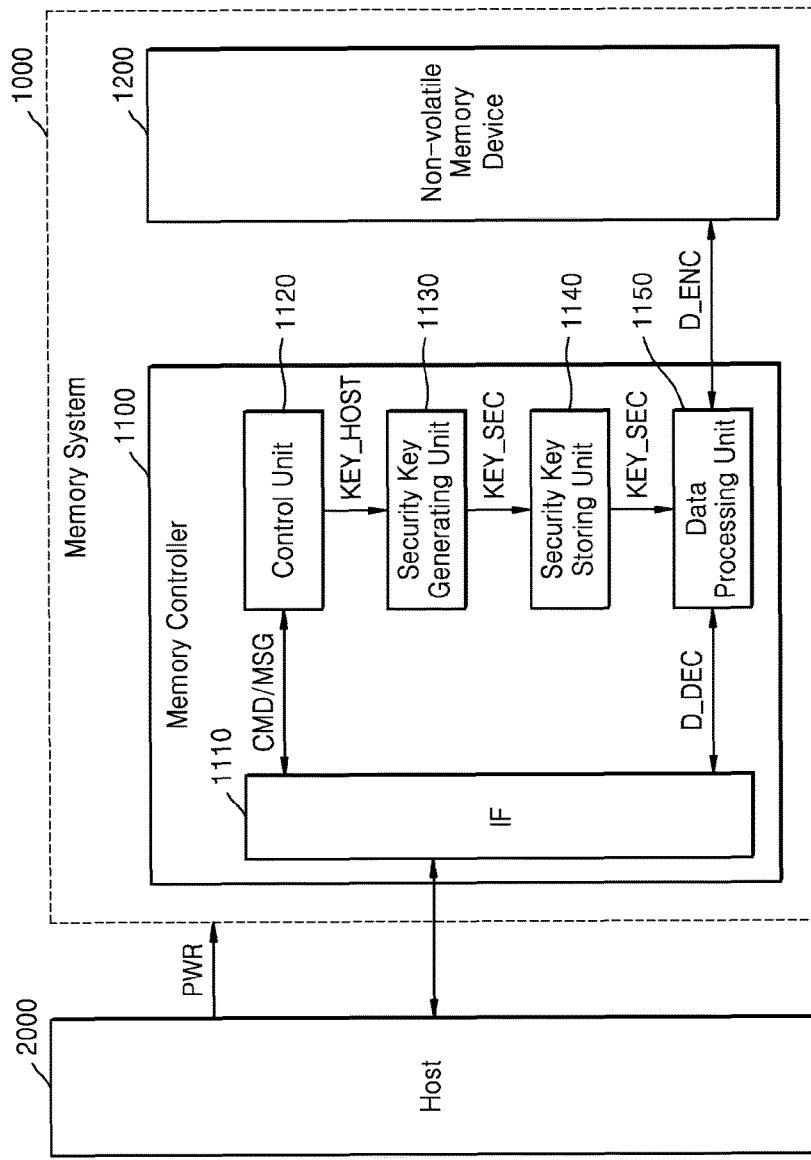
FIG. 1 is a diagram of a memory system including a memory controller, according to some example embodiments of the inventive concepts.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Reference will now be made to example embodiments, which are illustrated in the accompanying drawings, wherein like reference numerals may refer to like components throughout.

FIG. 1 is a diagram of a memory system 1000 including a memory controller 1100, according to some example embodiments of the inventive concepts.

As illustrated in FIG. 1, the memory system 1000 may communicate with a host 2000, and may include a non-volatile memory device 1200 and the memory controller 1100 configured to control the non-volatile memory device 1200. The host 2000 may transmit a command CMD to the memory system 1000, and the memory system 1000 may perform necessary operations in response to the received commands CMD. Also, the memory system 1000 may transmit a message MSG to the host 2000. The memory system 1000 and the host 2000 may transmit and receive commands and/or data according to a communication interface (IF), for example, advanced technology attachment (ATA), small computer system interface (SCSI), non-volatile memory express (NVMe), embedded multimedia card (eMMCs), or secure digital (SDs), but the communication interface is not limited thereto.

As illustrated in FIG. 1, the host 2000 may supply power PWR to the memory system 1000. For example, the memory system 1000 may receive direct current (DC) voltage, which may provide sufficient current, from the host 2000. The memory controller 1100 and the non-volatile memory device 1200, included in the memory system 1000, may perform necessary operations based on the power PWR received from the host 2000. For example, according to some example embodiments of the inventive concepts, the memory controller 1100 and the non-volatile memory device 1200 may generate a plurality of power supply voltages based on the power PWR received from the host 2000, and may perform various operations based on the generated power supply voltages. When the memory system 1000 is separated from the host 2000, the power PWR that is supplied from the host 2000 may be shut off.

The non-volatile memory device 1200 may refer to a memory or memory device capable of retaining stored data even if a power supply is shut off. Accordingly, data stored in the non-volatile memory device 1200 may be maintained even if the power PWR that is supplied to the memory system 1000 is shut off. The non-volatile memory device 1200 may be, for example, a NOT AND (NAND) flash memory, a vertical NAND (VNAND) flash memory, a NOT OR (NOR) flash memory, a resistive random-access memory (RRAM), a phase-change RAM (PRAM), a magnetoresistive RAM (MRAM), a ferroelectric RAM (FRAM), a spin transfer torque-RAM (STT-RAM), but is not limited thereto. The non-volatile memory device 1200 may have a three-dimensional (3D) array structure. Also, the non-volatile memory device 1200 may be embodied by not only a semiconductor memory device, but also a magnetic disc device. Some example embodiments of the inventive concepts may be applicable not only to a flash memory in which a charge storage layer includes a conductive floating gate, but also to a charge-trap-flash (CTF) device in which a charge storage layer includes an insulating layer. Hereinafter, a case in which the non-volatile memory device 1200 is a NAND flash memory will be described for brevity, but it will be understood that the inventive concepts are not limited thereto.

In some example embodiments of the present inventive concepts, a three-dimensional (3D) memory array may be provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

In some example embodiments of the present inventive concepts, the 3D memory array includes vertical NAND strings that are vertically oriented such that at least one memory cell is located over another memory cell. The at least one memory cell may comprise a charge trap layer.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133 B2; 8,553,466 B2; 8,654,587 B2; and 8,559,235 B2; and U.S. Patent Publication No. 2011/0233648 A1.

Due to characteristics of the non-volatile memory device 1200, in which stored data is maintained even if the power PWR is shut off, it may be necessary to maintain the security of data stored in the non-volatile memory device 1200. For example, when reusing or discarding the memory system 1000 or when an unauthorized carrying out of memory system 1000 is attempted, it is necessary to prevent a leak (e.g., access by unauthorized users) of data stored in the memory system 1000 (that is, data stored in the non-volatile memory device 1200 of the memory system 1000), which requires security. To this end, the memory system 1000 may support self-encryption. For example, the memory system 1000 may encrypt data received from the host 2000 and store the encrypted data to the non-volatile memory device 1200. Also, the memory system 1000 may decrypt encrypted data read from the non-volatile memory device 1200 and transmit the decrypted data to the host 2000. Accordingly, data stored in the non-volatile memory device 1200 is maintained in an encryption state and, thus, the security of the data may be maintained even if the power PWR that is supplied to the memory system 1000 is shut off. The memory system 1000 supporting self-encryption in this manner may be referred to as a self-encrypting device or self-encrypting drive (SED).

Encryption and decryption of data may be performed based on an encryption key (or a key). In other words, data may be encrypted based on an encryption key, and the encrypted data may be decrypted based on the encryption key used for the encryption. When the encryption key is leaked, data requiring security may be leaked by decrypting the encrypted data. Accordingly, security for the encryption key may be needed.

The memory system 1000 and the memory controller 1100 may support self-encryption. For example, the memory system 1000 may use a security key KEY_SEC, generated based on a host key KEY_HOST received from the host 2000, as an encryption key, or may use a characteristic key KEY_CHA, stored in the memory system 1000, as an encryption key.

As illustrated in FIG. 1, the memory controller 1100 of the memory system 1000 may be connected to the non-volatile memory device 1200 and the host 2000. The memory controller 1100 may be referred to as a controller. The memory controller 1100 may include an interface 1110, may receive a command CMD and data D_DEC from the host 2000 through the interface 1110, and may transmit a message MSG and data D_DEC to the host 2000. For example, the memory controller 1100 may receive a data write command from the host 2000 and may write data D_DEC accompanied with the received data write command into the non-volatile memory device 1200.

As illustrated in FIG. 1, the memory controller 1100 may include a control unit 1120, a security key generating unit 1130, a security key storing unit 1140, and a data processing unit 1150. The control unit 1120 may control other elements included in the memory controller 1100, and may receive the command CMD from the host 2000 through the interface 1110 or transmit the message MSG to the host 2000. For example, the control unit 1120 may receive a first command from the host 2000 and may receive the host key KEY_HOST from the host 2000. The control unit 1120 may enable a security mode in response to the received first command. The security mode may be defined as a mode in which the memory system 1000 performs encryption and decryption of data based on the security key KEY_SEC generated in the memory system 1000 based on the host key KEY_HOST received from the host 2000. The host key KEY_HOST may be received from the host 2000 in company with the first command or may be received from the host 2000 in company with a command other than the first command.

The security key generating unit 1130 may receive the host key KEY_HOST from the control unit 1120 and generate the security key KEY_SEC based on the host key KEY_HOST. For example, the security key generating unit 1130 may generate the security key KEY_SEC by mapping the host key KEY_HOST to the security key KEY_SEC according to a desired function (that may or may not be predetermined). The security key generating unit 1130 may store the generated security key KEY_SEC in the security key storing unit 1140.

The security key storing unit 1140 may store the security key KEY_SEC in a volatile manner. In other words, the security key storing unit 1140 may include a volatile memory that loses stored data when a power supply is shut off, like static random-access memory (SRAM), dynamic random-access memory (DRAM), a latch, a flip-flop, or a register, and may store the security key KEY_SEC in the volatile memory. As the security key storing unit 1140 stores, in a volatile manner, the security key KEY_SEC generated based on the host key KEY_HOST received from the host 2000, the security key KEY_SEC may be automatically deleted when the memory system 1000 is separated from the host 2000 or when the power PWR that is supplied to the memory system 1000 is shut off (for example, when the power PWR that is supplied to the host 2000 is shut off). Accordingly, data, stored in the non-volatile memory device 1200 after being encrypted based on an encryption key (e.g., the security key KEY_SEC) that depends on the host key KEY_HOST, may be securely maintained.

When the security mode is enabled by the control unit 1120, the data processing unit 1150 may generate encrypted data D_ENC by encrypting data D_DEC, received from the host 2000, based on the security key KEY_SEC stored in the security key storing unit 1140, or may generate data D_DEC by decrypting the encrypted data D_ENC stored in the non-volatile memory device 1200. When the security mode is not enabled by the control unit 1120, the data processing unit 1150 may not perform encryption and decryption of data, or may perform encryption and decryption of data by using an encryption key that is different from the security key KEY_SEC.

According to some example embodiments of the inventive concepts, the control unit 1120 may erase the host key KEY_HOST, stored in a memory such as a buffer to transmit the host key KEY_HOST to the security key generating unit 1130, after transmitting the host key KEY_HOST to the security key generating unit 1130. The security key generating unit 1130 may not store the host key KEY_HOST received from the control unit 1120. For example, the security key generating unit 1130 may erase the host key KEY_HOST, stored in a memory such as a register to generate the security key KEY_SEC, after generating the security key KEY_SEC. Similarly, the security key generating unit 1130 may erase the security key KEY_SEC, stored in an internal memory of the security key generating unit 1130 in the process of generating the security key KEY_SEC, after storing the generated security key KEY_SEC in the security key storing unit 1140.

According to some example embodiments of the inventive concepts, the control unit 1120 may transmit a message, which requests the host key KEY_HOST, to the host 2000 through the interface 1110 when the security mode is enabled. For example, when the first command is received from the host 2000, the control unit 1120 may transmit a message, which requests the host key KEY_HOST, to the host 2000 to generate the security key KEY_SEC. According to some example embodiments of the inventive concepts, the control unit 1120 may transmit a message, which periodically requests the host key KEY_HOST, to the host 2000, and the security key generating unit 1130 may generate the security key KEY_SEC again based on the host key KEY_HOST transmitted from the host 2000 in response to the message. Accordingly, as the security key KEY_SEC is periodically generated again and the periodically generated security key KEY_SEC is used for encryption and decryption, the security key KEY_SEC may be managed with a high level of security.

Although the control unit 1120, the security key generating unit 1130, and the data processing unit 1150, illustrated in FIG. 1, are independent elements, this is only an example embodiment. For example, the control unit 1120, the security key generating unit 1130, and the data processing unit 1150 may be blocks of software that are executed in a single hardware element (e.g., a single processor). The control unit 1120, the security key generating unit 1130, and the data processing unit 1150 may be independent processors or may be digital circuits each including a plurality of logic gates.

Figure 2:
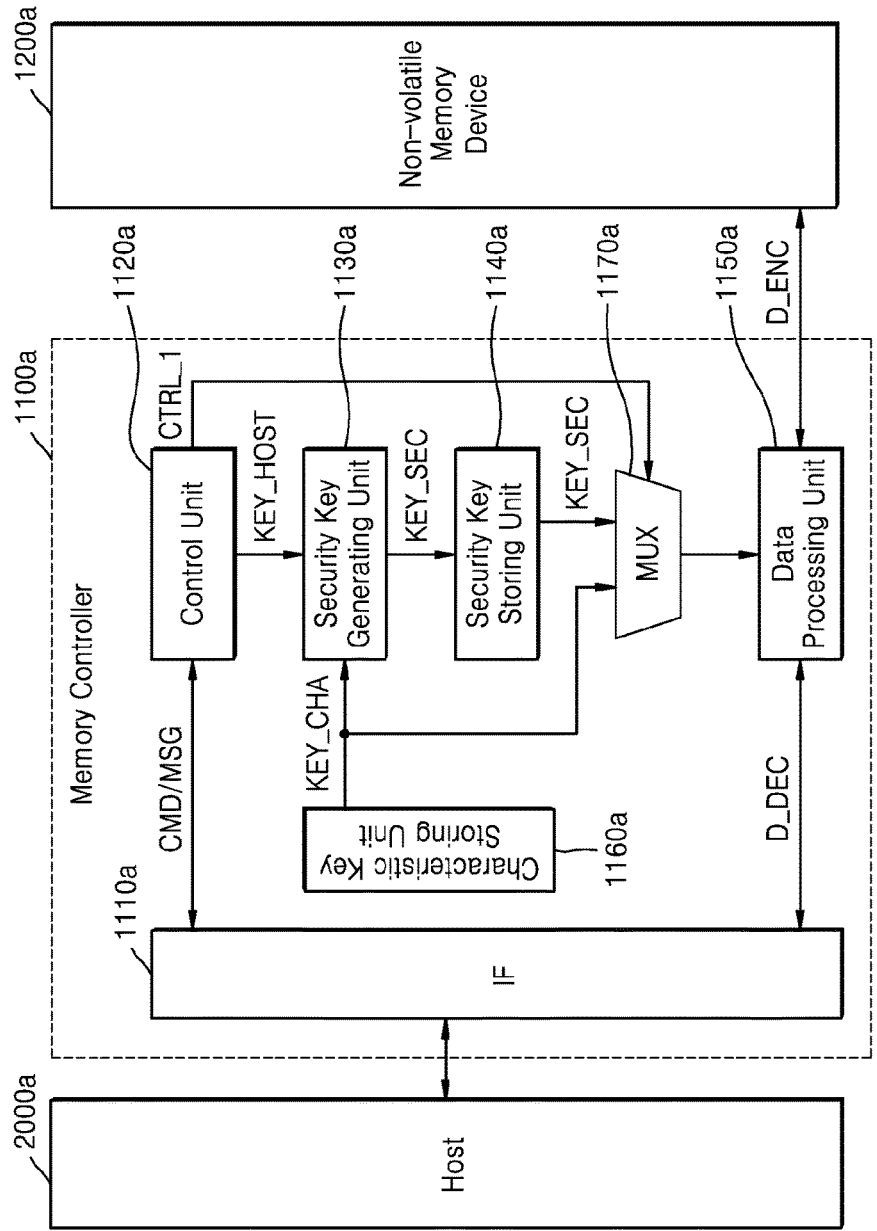
FIG. 2 is a diagram of a memory controller, according to some example embodiments of the inventive concepts.

FIG. 2 is a diagram of a memory controller 1100a, according to some example embodiments of the inventive concepts.

Similar to the memory controller 1100 of FIG. 1, the memory controller 1100a may be connected to a host 2000a and a non-volatile memory device 1200a, and may include an interface 1110a, a control unit 1120a, a security key generating unit 1130a, a security key storing unit 1140a, and a data processing unit 1150a. The interface 1110a, the control unit 1120a, the security key generating unit 1130a, the security key storing unit 1140a, and the data processing unit 1150a may perform functions that are the same as or similar to those of corresponding elements illustrated in FIG. 1.

As illustrated in FIG. 2, the memory controller 1100a may further include a characteristic key storing unit 1160a and a multiplexer 1170a. The characteristic key storing unit 1160a may store a characteristic key KEY_CHA in a non-volatile manner. For example, the characteristic key storing unit 1160a may include a non-volatile memory that maintains stored data even if a power supply is shut off, like an antifuse and a flash memory, and may store the characteristic key KEY_CHA in the non-volatile memory. According to some example embodiments of the inventive concepts, the characteristic key KEY_CHA may be used as an encryption key for encryption and decryption of data when a security mode is not enabled, or may be used for generating a security key KEY_SEC along with a host key KEY_HOST when the security mode is enabled. The characteristic key KEY_CHA may be unique to the memory controller 1100a (or the memory system 1000 including the memory controller 1100a) and different for other memory controllers (or other memory systems including memory controllers).

The security key generating unit 1130a may generate the security key KEY_SEC based on the host key KEY_HOST and the characteristic key KEY_CHA. The security key KEY_SEC may be generated based on the host key KEY_HOST received from the host 2000a and the characteristic key KEY_CHA intrinsic to the memory controller 1100a and, thus, the characteristic key KEY_CHA that is used as an encryption key for encryption and decryption of data may be maintained with a high level of security.

The control unit 1120a may control the multiplexer 1170a by using a first control signal CTRL_1 according to whether the security mode is enabled. For example, when the security mode is enabled, the control unit 1120a may control the multiplexer 1170a by using the first control signal CTRL_1 so that the data processing unit 1150a may receive the security key KEY_SEC stored in the security key storing unit 1140a. When the security mode is not enabled, the control unit 1120a may control the multiplexer 1170a by using the first control signal CTRL_1 so that the data processing unit 1150a may receive the characteristic key KEY_CHA stored in the characteristic key storing unit 1160a.

Although an example embodiment of the memory controller 1100a including the multiplexer 1170a is illustrated in FIG. 2, the inventive concepts are not limited thereto. For example, according to some example embodiments of the inventive concepts, when the security mode is not enabled, the characteristic key storing unit 1160a may directly store the characteristic key KEY_CHA in the security key storing unit 1140a. According to some example embodiments of the inventive concepts, when the security mode is not enabled, the security key generating unit 1130a may generate the security key KEY_SEC based on the characteristic key KEY_CHA. In other words, when the security mode is not enabled, the security key generating unit 1130a may generate an encryption key, which is the same as the characteristic key KEY_CHA, as the security key KEY_SEC, and may also generate an encryption key as the security key KEY_SEC by mapping the characteristic key KEY_CHA to the encryption key based on a desired function (that may or may not be predetermined). In this manner, as the security key storing unit 1140a stores an encryption key generated in a different manner according to whether the security mode is enabled, instead of including the multiplexer 1170a, the data processing unit 1150a may perform encryption and decryption of data based on an encryption key read by accessing the security key storing unit 1140a regardless of whether the security mode is enabled.

Figure 3A:
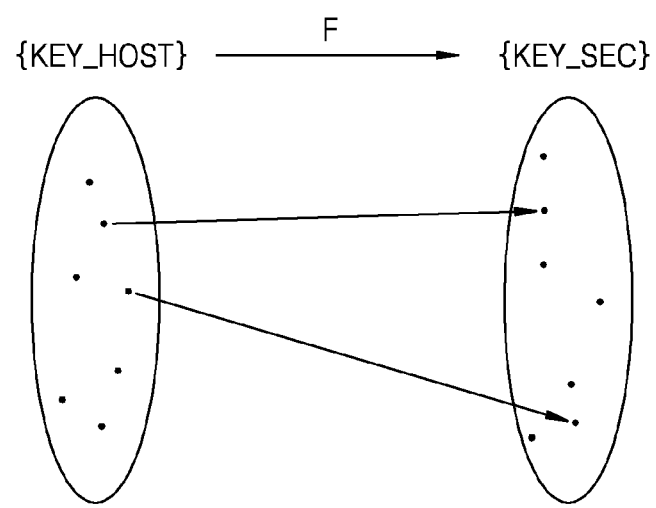
FIGS. 3A and 3B are diagrams describing operations of the security key generating units of FIGS. 1 and 2.
Figure 3B:
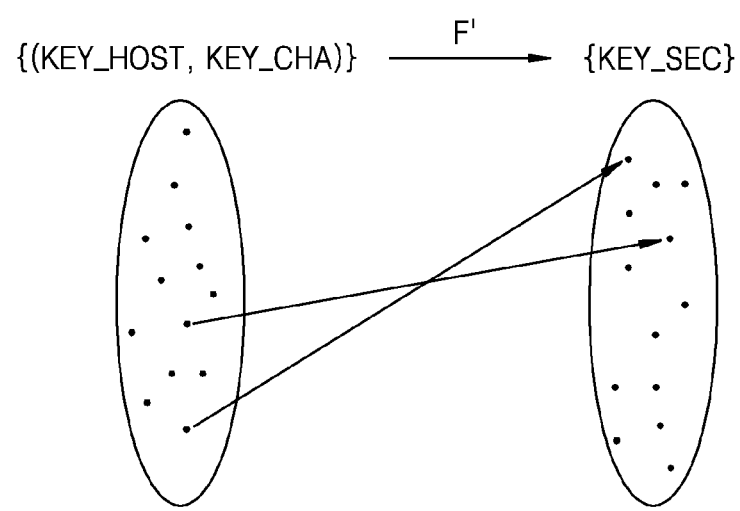

FIGS. 3A and 3B are diagrams describing operations of the security key generating units 1130 and 1130a of FIGS. 1 and 2. Specifically, FIG. 3A is a diagram illustrating an operation of the security key generating unit 1130 of FIG. 1, and FIG. 3B is a diagram illustrating an operation of the security key generating unit 1130a of FIG. 2.

The security key generating unit 1130 illustrated in FIG. 1 may generate the security key KEY_SEC based on the host key KEY_HOST received from the host 2000. As illustrated in FIG. 3A, the security key generating unit 1130 may generate the security key KEY_SEC by mapping the host key KEY_HOST to the security key KEY_SEC according to a desired function F (that may or may not be predetermined). According to some example embodiments of the inventive concepts, the security key KEY_SEC generated based on the function F may have an entropy that is greater than or equal to the entropy of the host key KEY_HOST. For example, the host key KEY_HOST may be a random number and desirably have a high entropy. The entropy of the host key KEY_HOST may be reflected to the security key KEY_SEC without being reduced by the function F, such as an identity function or a negation function.

The security key generating unit 1130a illustrated in FIG. 2 may generate the security key KEY_SEC based on the host key KEY_HOST received from the host 2000a and the characteristic key KEY_CHA stored in the characteristic key storing unit 1160a. As illustrated in FIG. 3B, the security key generating unit 1130a may generate the security key KEY_SEC by mapping the host key KEY_HOST and the characteristic key KEY_CHA to the security key KEY_SEC according to a desired function F' (that may or may not be predetermined). According to some example embodiments of the inventive concepts, the security key KEY_SEC generated based on the function F' may have an entropy that is greater than or equal to the entropy of each of the host key KEY_HOST and the characteristic key KEY_CHA. For example, the host key KEY_HOST and the characteristic key KEY_CHA may be individually generated random numbers and have respective entropies. The entropy of the host key KEY_HOST and the entropy of the characteristic key KEY_CHA may be reflected to the security key KEY_SEC without being reduced by the function F'. For example, a function F'(a, b) may be 'a XOR b', 'Enc(a, b)' that is a result obtained by encrypting 'a' by using 'b', or 'Dec(a, b)' that is a result obtained by decrypting 'a' by using 'b'. As another example, the function F'(a, b) may be 'Hash(a∥b)', such as secure hash algorithm (SHA), message digest algorithm 5 (MD5), or keyed-hash message authentication code (HMAC).

Figure 4:
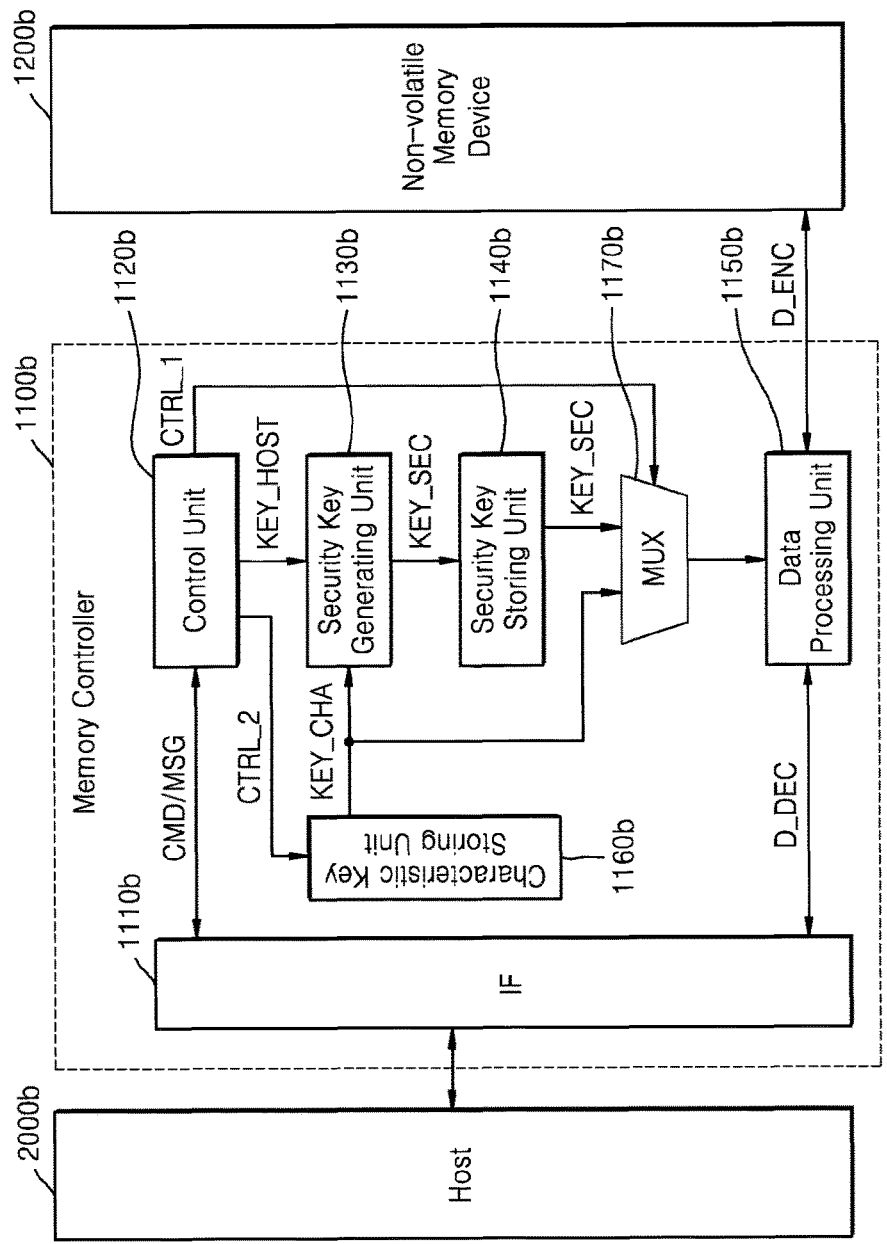
FIG. 4 is a diagram of a memory controller, according to some example embodiments of the inventive concepts.

FIG. 4 is a diagram of a memory controller 1100b, according to some example embodiments of the inventive concepts.

Similar to the memory controller 1100a of FIG. 2, the memory controller 1100b may be connected to a host 2000b and a non-volatile memory device 1200b, and may include an interface 1110b, a control unit 1120b, a security key generating unit 1130b, a security key storing unit 1140b, a data processing unit 1150b, a characteristic key storing unit 1160b, and a multiplexer 1170b. The interface 1110b, the control unit 1120b, the security key generating unit 1130b, the security key storing unit 1140b, the data processing unit 1150b, the characteristic key storing unit 1160b, and the multiplexer 1170b may perform functions that are the same as or similar to those of corresponding elements illustrated in FIG. 2.

According to some example embodiments of the inventive concepts, the memory controller 1100b may change the value of a characteristic key KEY_CHA in response to a command received from the host 2000b. For example, the control unit 1120b of the memory controller 1100b may change the value of the characteristic key KEY_CHA stored in the characteristic key storing unit 1160b, in response to a second command received from the host 2000b. As illustrated in FIG. 4, the control unit 1120b may transmit a second control signal CTRL_2 to the characteristic key storing unit 1160b in response to the second command, and the characteristic key storing unit 1160b may change a stored value of the characteristic key storing unit 1160b in response to the received second control signal CTRL_2. For example, the characteristic key storing unit 1160b may include a random number generator, the random number generator may generate a random number in response to the second control signal CTRL_2, and the characteristic key KEY_CHA having the generated random number as the value thereof may be stored in the characteristic key storing unit 1160b.

When the host 2000b desires to store new data in the non-volatile memory device 1200b after discarding data stored in the non-volatile memory device 1200b, data to be discarded may need to be securely maintained. In this case, as the host 2000b transmits a second command to the memory controller 1100b instead of transmitting an erase command (or a sanitization command) for the entire area of the non-volatile memory device 1200b, a leak of data stored in the non-volatile memory device 1200b, which is to be discarded, may be prevented by using a characteristic key KEY_CHA before the change of the value thereof (or by using an encryption key, e.g., a security key KEY_SEC), generated based on the host key KEY_HOST and the characteristic key KEY_CHA before the change when a security mode is enabled).

When the host 2000b writes or reads data to or from a memory system in a state in which the security mode is enabled by transmitting a first command and the host key KEY_HOST to the memory controller 1100b in advance, the host 2000b may have the same effect as transmitting the second command by transmitting a new host key KEY_HOST to the memory controller 1100b. In addition, when the host 2000b transmits both the second command and a new host key KEY_HOST to the memory controller 1100b, a leak of data stored in the non-volatile memory device 1200b may be more effectively prevented.

Figure 5:
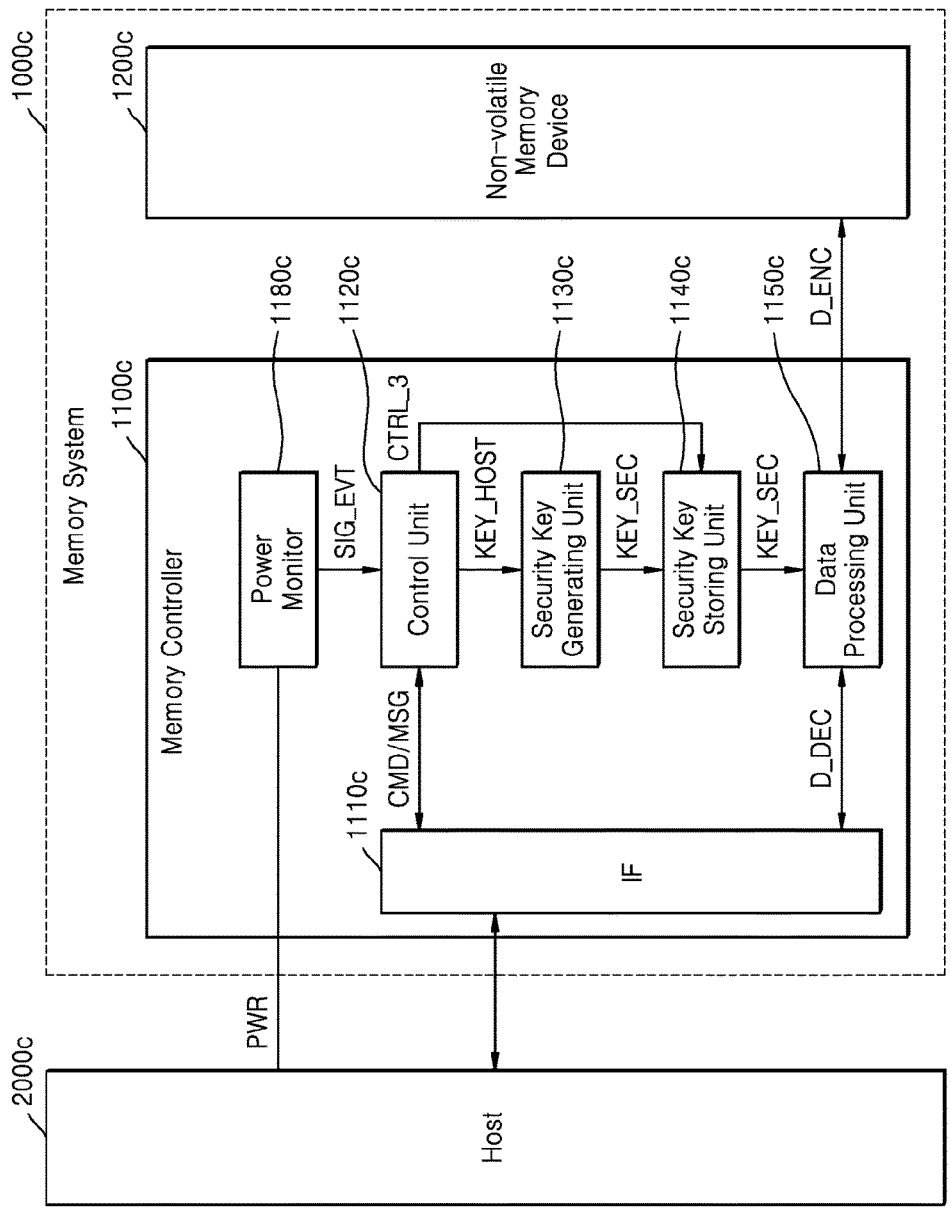
FIG. 5 is a diagram of a memory system including a memory controller, according to some example embodiments of the inventive concepts.

FIG. 5 is a diagram of a memory system 1000c including a memory controller 1100c, according to some example embodiments of the inventive concepts.

Similar to the memory system 1000 of FIG. 1, the memory system 1000c may communicate with a host 2000c, and may include the memory controller 1100c and a non-volatile memory device 1200c. Similar to the memory controller 1100, the memory controller 1100c may include an interface 1110c, a control unit 1120c, a security key generating unit 1130c, a security key storing unit 1140c, and a data processing unit 1150c. The interface 1110c, the control unit 1120c, the security key generating unit 1130c, the security key storing unit 1140c, and the data processing unit 1150c may perform functions that are the same as or similar to those of corresponding elements illustrated in FIG. 1.

According to some example embodiments of the inventive concepts, the memory controller 1100c may include a power monitor 1180c, and the power monitor 1180c may monitor power PWR supplied from the host 2000c. For example, when the memory system 1000c is separated from the host 2000c or when an attempt to change a physical environment of the outside of the memory system 1000c occurs to improperly access the memory system 1000c, the power monitor 1180c may sense such events through the monitoring of the power PWR.

The power monitor 1180c may immediately transmit an event signal SIG_EVT to the control unit 1120c when an event occurs. The control unit 1120c may sanitize the security key storing unit 1140c by transmitting a third control signal CTRL_3 to the security key storing unit 1140c in response to the received event signal SIG_EVT. For example, the control unit 1120c may overwrite a specific value, such as zero, into the security key storing unit 1140c by transmitting the third control signal CTRL_3 to the security key storing unit 1140c or may change states of memory devices included in the security key storing unit 1140c into specific states.

The power monitor 1180c, the control unit 1120c, and the security key storing unit 1140c may be connected to a power loss protection (PLP), so that the security key storing unit 1140c may be sanitized even if the power PWR that is supplied to the memory system 1000c is abnormal. For example, the power monitor 1180c, the control unit 1120c, and the security key storing unit 1140c may each be connected to a capacitor having a relatively large capacitance, and the security key storing unit 1140c may be sanitized by the capacitor that may supply a current for a period of time even if the power PWR that is supplied to the memory system 1000c is shut off. Accordingly, as the security key KEY_SEC used for storing data in the non-volatile memory device 1200c is forcibly sanitized, data stored in the non-volatile memory device 1200c may be protected from an improper attempt based on data retention characteristics of memory devices included in the security key storing unit 1140c.

Although the security key storing unit 1140c of FIG. 5 is sanitized by receiving the third control signal CTRL_3 from the control unit 1120c, the inventive concepts are not limited thereto. For example, according to some example embodiments of the inventive concepts, the power monitor 1180c may generate the third control signal CTRL_3 when an event occurs, and may transmit the generated third control signal CTRL_3 to the security key storing unit 1140c. Accordingly, the control unit 1120c may not be connected to the capacitor.

Figure 6:
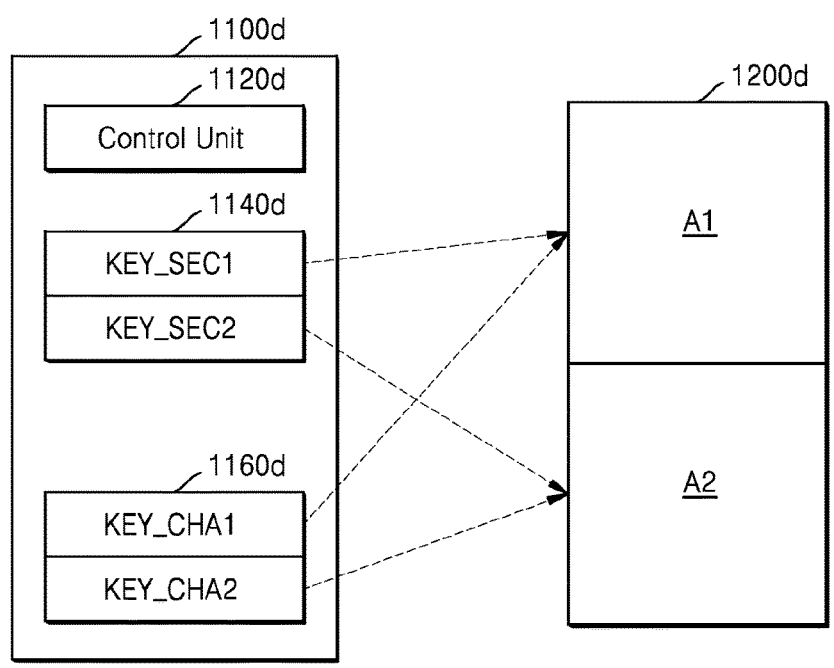
FIG. 6 is a diagram describing operation of a memory controller, according to some example embodiments of the inventive concepts.

FIG. 6 is a diagram describing operation of a memory controller 1100d, according to some example embodiments of the inventive concepts. According to some example embodiments of the inventive concepts, a control unit 1120d of the memory controller 1100d may manage two or more areas of a non-volatile memory device 1200d that do not overlap each other. A security key storing unit 1140d of the memory controller 1100d may store two or more security keys (e.g., first security key KEY_SEC1 and second security key KEY_SEC2) corresponding to areas of the non-volatile memory device 1200d, and the characteristic key storing unit 1160d may store two or more characteristic keys (e.g., first characteristic key KEY_CHA1 and second characteristic key KEY_CHA2) corresponding to areas of the non-volatile memory device 1200d.

As illustrated in FIG. 6, the non-volatile memory device 1200d may be managed as a first area A1 and a second area A2, which do not overlap each other, by the control unit 1120d of the memory controller 1100d. The first area A1 and the second area A2 may be physical areas that are differentiated from each other by a physical address received by the non-volatile memory device 1200d or may be logical areas that are differentiated from each other by a logical address generated by the control unit 1120d.

Figure 7:
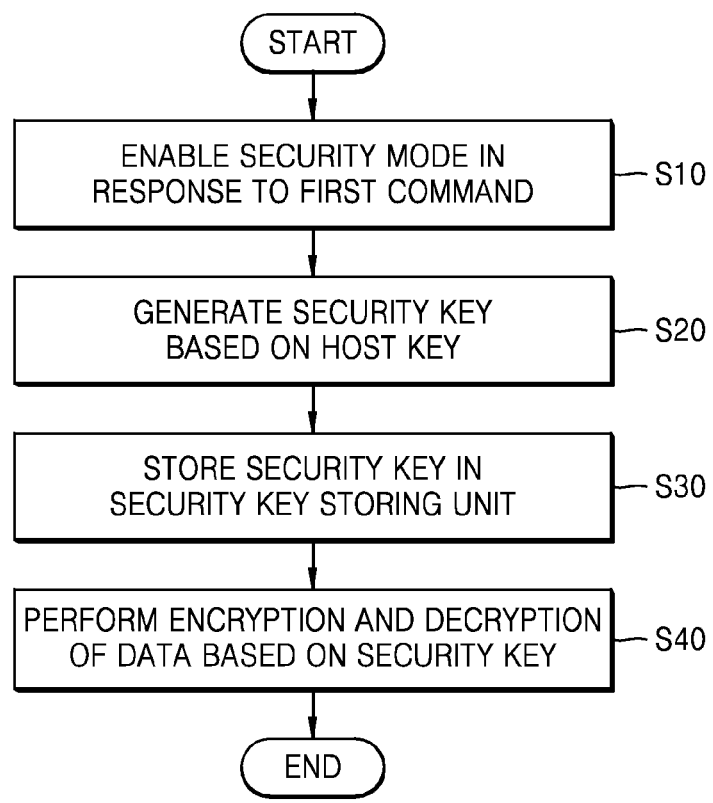
FIG. 7 is a flowchart illustrating an operating method of a memory controller, according to some example embodiments of the inventive concepts.

FIG. 7 is a flowchart illustrating an operating method of a memory controller, according to some example embodiments of the inventive concepts. The operating method of a memory controller may be referred to as a controlling method of a non-volatile memory device. Methods illustrated in flowcharts of FIGS. 7 to 11 may be performed in a memory controller according to any one of the example embodiments described above. The operating method illustrated in FIG. 7 is described with reference to FIG. 1.

As illustrated in FIG. 7, the operating method of the memory controller 1100 may include enabling a security mode in response to a first command received from the host 2000 (operation S10). For example, the control unit 1120 may receive the first command from the host 2000 through the interface 1110, and may enable the security mode in response to the received first command.

The security key generating unit 1130 may generate the security key KEY_SEC based on the received host key KEY_HOST (operation S20). For example, the host key KEY_HOST may be received from the host 2000 in company with the first command, and the security key generating unit 1130 may generate the security key KEY_SEC based on the host key KEY_HOST received from the control unit 1120. Next, the security key generating unit 1130 may store the generated security key KEY_SEC in the security key storing unit 1140 (operation S30). For example, the security key storing unit 1140 may be a volatile memory, and the security key KEY_SEC stored in the security key storing unit 1140 may be automatically deleted when the power PWR that is supplied to the memory system 1000 is shut off. Accordingly, the security of data stored in the non-volatile memory device 1200 after being encrypted based on the security key KEY_SEC may be maintained even if the memory system 1000 is separated from the host 2000.

As illustrated in FIG. 7, the data processing unit 1150 may perform encryption and decryption of data based on the security key KEY_SEC stored in the security key storing unit 1140 (operation S40). For example, the data processing unit 1150 may encrypt data received from the host 2000 or may decrypt data read from the non-volatile memory device 1200, based on the security key KEY_SEC stored in the security key storing unit 1140.

Figure 8:
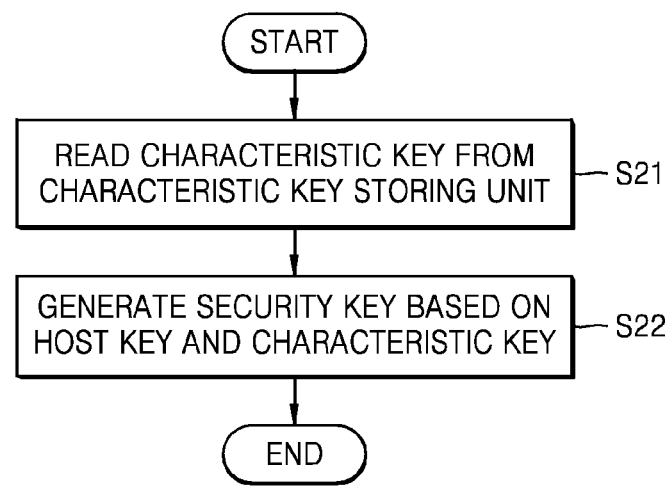
FIG. 8 is a flowchart illustrating an operation of generating a security key, according to some example embodiments of the inventive concepts.

FIG. 8 is a flowchart illustrating the operation S20 of generating the security key KEY_SEC, illustrated in FIG. 7, according to some example embodiments of the inventive concepts. Referring to FIG. 2, the memory controller 1100a may include a characteristic key storing unit 1160a, and the characteristic key storing unit 1160a may store the characteristic key KEY_CHA in a non-volatile manner.

As illustrated in FIG. 8, the characteristic key KEY_CHA stored in the characteristic key storing unit 1160a may be read (operation S21). For example, the security key generating unit 1130a may access the characteristic key storing unit 1160a, and may read the characteristic key KEY_CHA stored in the characteristic key storing unit 1160a.

Next, the security key generating unit 1130a may generate the security key KEY_SEC based on the host key KEY_HOST received from the host 2000 and the characteristic key KEY_CHA (operation S22). For example, the security key generating unit 1130a may receive the host key KEY_HOST from the control unit 1120a, and may receive the characteristic key KEY_CHA from the characteristic key storing unit 1160a. The security key generating unit 1130a may generate the security key KEY_SEC based on the received host key KEY_HOST and the received characteristic key KEY_CHA, and the entropy of the generated security key KEY_SEC may be greater than or equal to that of each of the host key KEY_HOST and the characteristic key KEY_CHA.

Figure 9A:
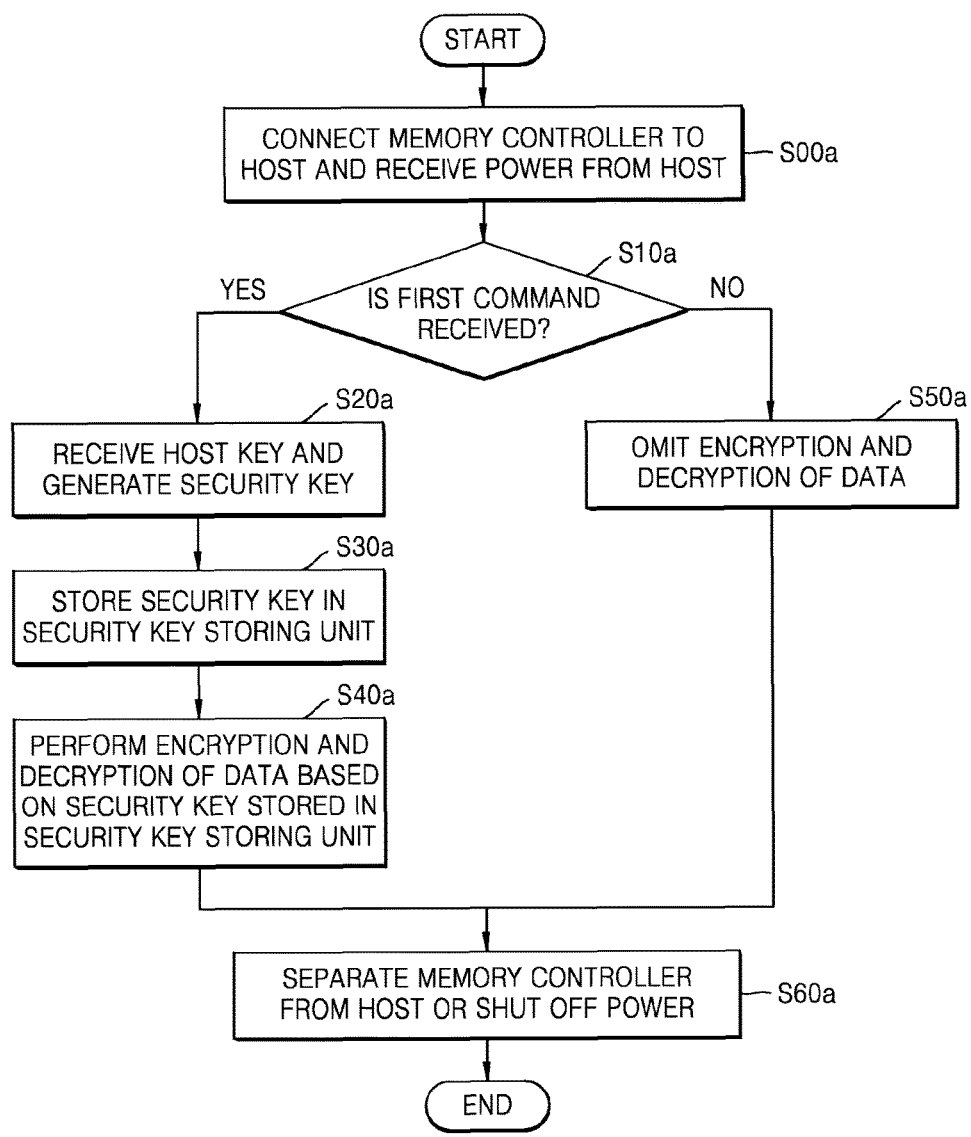
FIGS. 9A and 9B are flowcharts illustrating operating methods of a memory controller, according to some example embodiments of the inventive concepts.
Figure 9B:
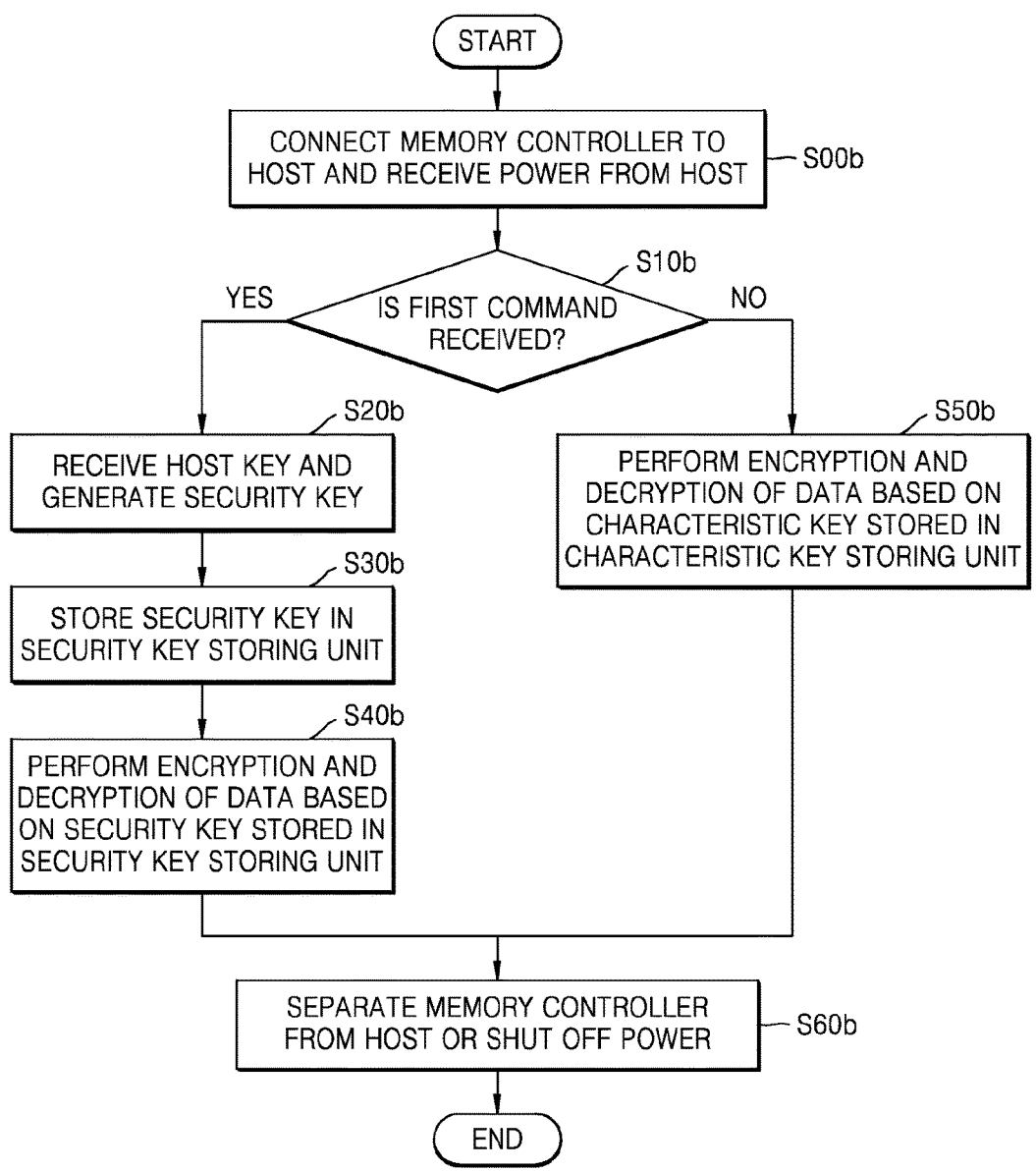

FIGS. 9A and 9B are flowcharts illustrating operating methods of a memory controller, according to some example embodiments of the inventive concepts. The operating method illustrated in FIG. 9A and the operating method illustrated in FIG. 9B may be different in an operation that is performed when the security mode is not enabled.

FIG. 9A is a flowchart illustrating an operating method of a memory controller according to whether a security mode is enabled, according to some example embodiments of the inventive concepts. Referring to FIG. 9A and FIG. 2, the memory controller 1100a (or a memory system including the memory controller 1100a and the non-volatile memory device 1200a) may be connected to the host 2000a, and may receive power from the host 2000a (operation S00a). The host 2000a may transmit a first command to the memory controller 1100a to enable the security mode, and the control unit 1120a of the memory controller 1100a may determine whether a command received through the interface 1110a from the host 2000a is the first command (operation S10a).

When the command received from the host 2000a is the first command, the control unit 1120a may enable the security mode, and may transmit the host key KEY_HOST received from the host 2000a to the security key generating unit 1130a. The security key generating unit 1130a may receive the host key KEY_HOST from the control unit 1120a, and may generate the security key KEY_SEC based on the host key KEY_HOST (operation S20a). According to some example embodiments of the inventive concepts, the security key generating unit 1130a may generate the security key KEY_SEC based on the characteristic key KEY_CHA stored in the characteristic key storing unit 1160a, as well as the host key KEY_HOST. The security key generating unit 1130a may store the security key KEY_SEC in the security key storing unit 1140a (operation S30a), and the security key storing unit 1140a may store the security key KEY_SEC in a volatile manner. The data processing unit 1150a may perform encryption and decryption of data based on the security key KEY_SEC stored in the security key storing unit 1140a (operation S40a).

When the command received from the host 2000a is not the first command, the control unit 1120a may not enable the security mode. When the security mode is not enabled, the data processing unit 1150a may omit encryption and decryption of data (operation S50a). For example, the data processing unit 1150a may omit encryption of data received from the host 2000a, and may omit decryption of data stored in the non-volatile memory device 1200a. In other words, when the security mode is not enabled, the data processing unit 1150a may store data received from the host 2000a in the non-volatile memory device 1200a, without encrypting the data received from the host 2000a.

The memory controller 1100a (or the memory system including the memory controller 1100a) may be separated from the host 2000a or power supplied from the host 2000a may be shut off (operation S60a). Accordingly, the security key KEY_SEC stored in the security key storing unit 1140a and used as an encryption key in the security mode may be automatically deleted. According to some example embodiments, the security key storing unit 1140a may be sanitized, similar to the example embodiment illustrated in FIG. 5.

FIG. 9B is a flowchart illustrating an operating method of a memory controller according to whether a security mode is enabled, according to some example embodiments of the inventive concepts. Operations S00b, S10b, S20b, S30b, S40b, and S60b of FIG. 9B may be the same as or similar to operations S00a, S10a, S20a, S30a, S40a, and S60a of FIG. 9A.

The operating method of the memory controller may include a data processing operation of performing encryption and decryption of data based on the characteristic key KEY_CHA when the security mode is not enabled. Referring to FIGS. 9B and 2, when a command received from the host 2000a is not a first command, the control unit 1120a may not enable the security mode, and the data processing unit 1150a may perform encryption and decryption of data based on the characteristic key KEY_CHA stored in the characteristic key storing unit 1160a (operation S50b). For example, the data processing unit 1150a may encrypt data received from the host 2000a, based on the characteristic key KEY_CHA, and may decrypt data stored in the non-volatile memory device 1200a, based on the characteristic key KEY_CHA.

Although not illustrated in FIG. 2, the data processing unit 1150a may include an element for encoding data to correct an error of data, like an error correction engine (ECC engine). In some embodiments, such as those illustrated in FIGS. 9A and 9B, the data processing unit 1150a may perform data encoding by using an element such as the ECC engine. Specifically, in the example embodiment of FIG. 9A, the non-volatile memory device 1200a may store data obtained by encoding data received from the host 2000a. In the example embodiment of FIG. 9B, the non-volatile memory device 1200a may store data obtained by encrypting data received from the host 2000a, based on the characteristic key KEY_CHA, and additionally encoding the data.

Figure 10:
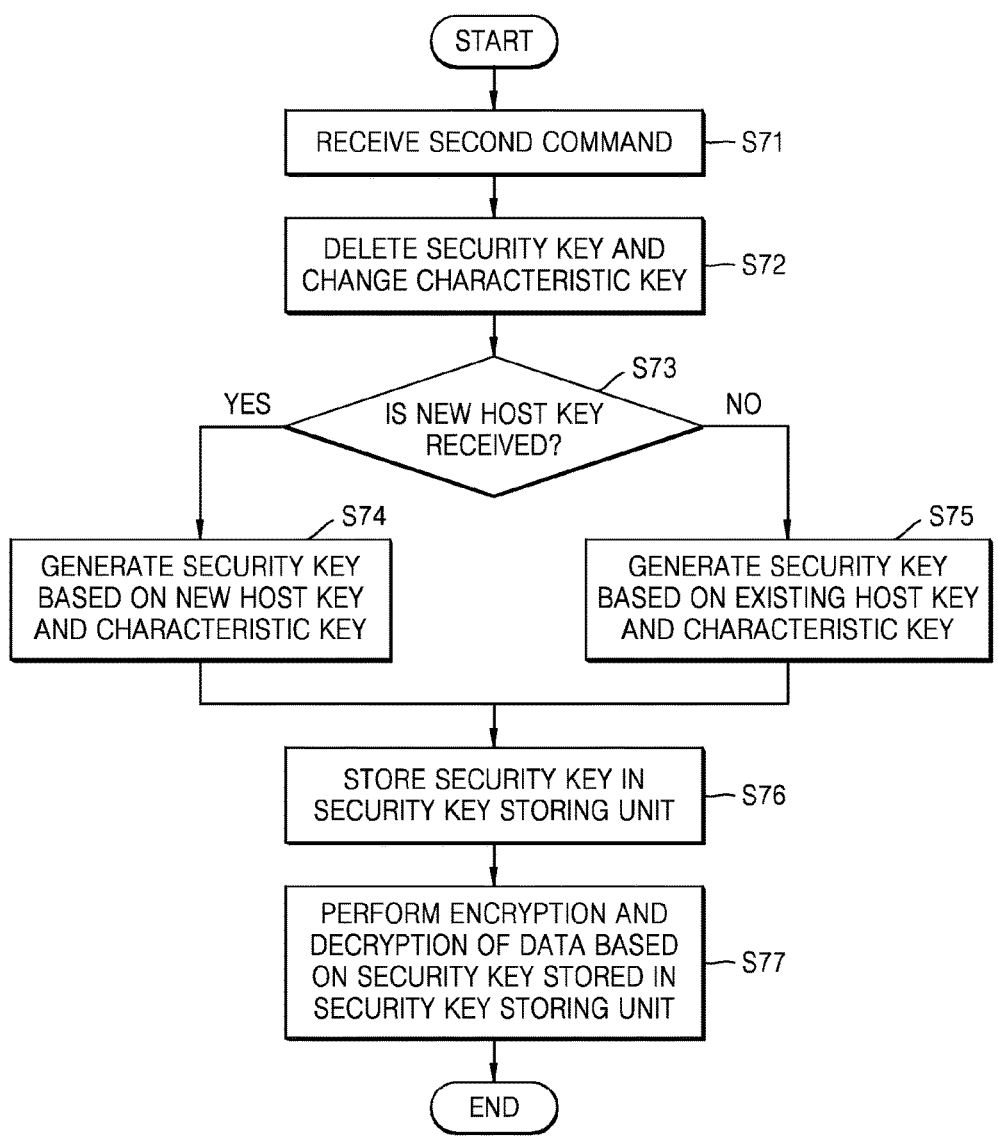
FIG. 10 is a flowchart illustrating an operating method of a memory controller, according to some example embodiments of the inventive concepts.

FIG. 10 is a flowchart illustrating an operating method of a memory controller, according to some example embodiments of the inventive concepts. Specifically, FIG. 10 illustrates an operating method of a memory controller, in which an encryption key that is used for encryption and decryption of data is changed when a security mode is enabled. According to some example embodiments of the inventive concepts, the operating method of the memory controller may include changing a characteristic key in response to a second command received from a host.

Referring to FIGS. 10 and 4, the memory controller 1100b may receive the second command through the interface 1110b from the host 2000b (operation S71). The control unit 1120b may delete the security key KEY_SEC stored in the security key storing unit 1140b, in response to the second command, and may change the characteristic key KEY_CHA stored in the characteristic key storing unit 1160b (operation S72). The changed characteristic key KEY_CHA may be used as an encryption key in encryption and decryption of data when the security mode is not enabled, and may be reflected in the security key KEY_SEC along with the host key KEY_HOST when the security mode is enabled. The control unit 1120b may determine whether a new host key KEY_HOST is received from the host 2000b (operation S73).

When it is determined that a new host key KEY_HOST is received from the host 2000b, the control unit 1120b may transmit the new host key KEY_HOST to the security key generating unit 1130b, and the security key generating unit 1130b may generate a new security key KEY_SEC based on the new host key KEY_HOST and the changed characteristic key KEY_CHA (operation S74). When it is determined that a new host key KEY_HOST is not received from the host 2000b, the security key generating unit 1130b may generate a new security key KEY_SEC based on the existing host key KEY_HOST and the changed characteristic key KEY_CHA (operation S75). As a result, an encryption key that is used for encryption and decryption of data may be changed by the second command.

The security key generating unit 1130b may store the generated security key KEY_SEC in the security key storing unit 1140b (operation S76). The data processing unit 1150b may perform encryption and decryption of data based on the security key KEY_SEC stored in the security key storing unit 1140b (operation S77).

Figure 11:
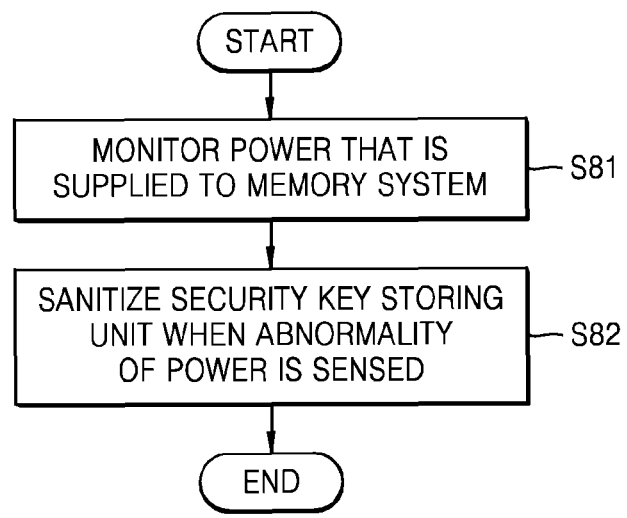
FIG. 11 is a flowchart illustrating an operating method of a memory controller, according to some example embodiments of the inventive concepts.

FIG. 11 is a flowchart illustrating an operating method of a memory controller, according to some example embodiments of the inventive concepts. Specifically, FIG. 11 illustrates an operation of a memory controller including a power monitor. The operating method of the memory controller is described with reference to FIG. 5.

As illustrated in FIG. 11, the operating method of the memory controller 1100c may include monitoring the power PWR that is supplied to the memory system 1000c (operation S81). For example, the power monitor 1180c of the memory controller 1100c may monitor the power PWR that is supplied from the host 2000c, and may sense abnormality generated in the power PWR, that is, an event.

Also, the operating method of the memory controller 1100c may include sanitizing the security key storing unit 1140c when the abnormality of the power PWR is sensed (operation S82). For example, the power monitor 1180c may generate an event signal SIG_EVT when the abnormality of the power PWR is sensed, and may immediately transmit the event signal SIG_EVT to the control unit 1120c. The control unit 1120c may sanitize the security key storing unit 1140c in response to the received event signal SIG_EVT. As described above, according to some example embodiments of the inventive concepts, the power monitor 1180c may directly sanitize the security key storing unit 1140c.

Figure 12:
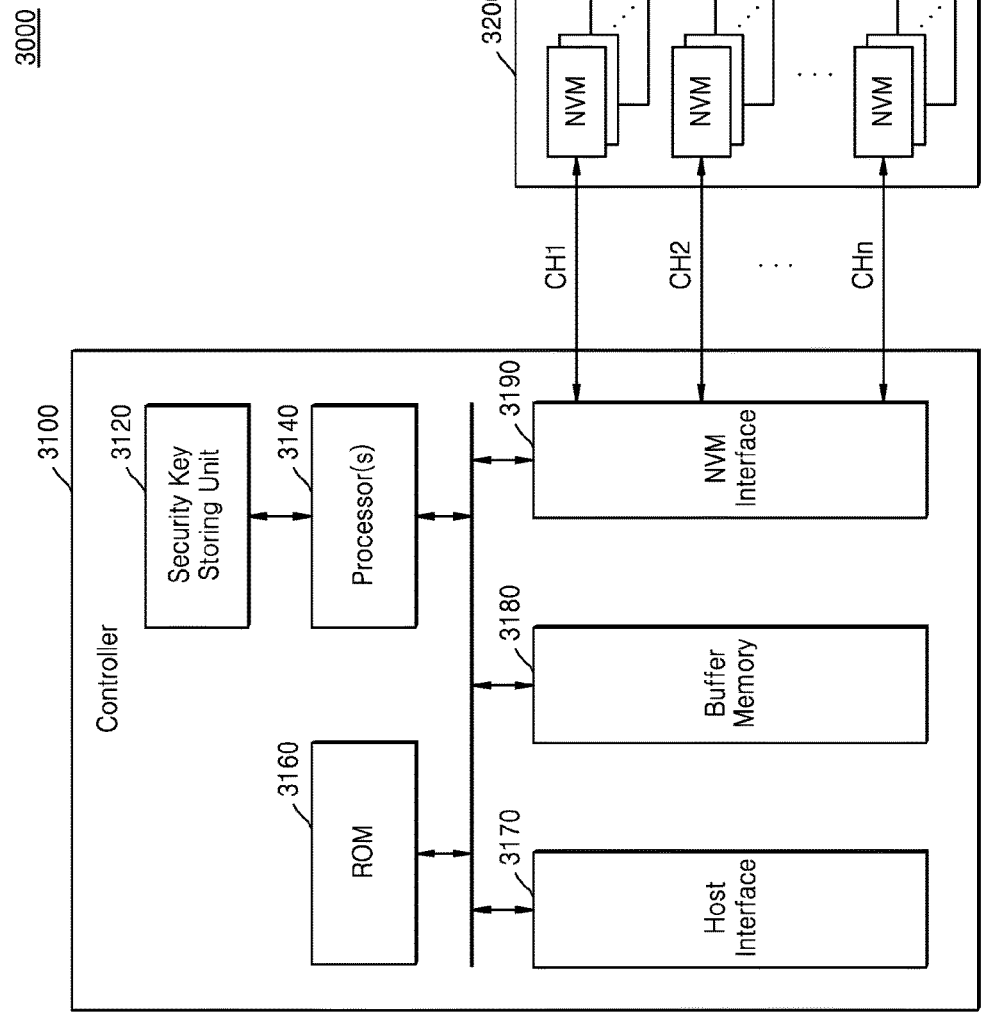
FIG. 12 is a diagram of a solid-state drive (SSD), according to some example embodiments of the inventive concepts.

FIG. 12 is a diagram of a solid-state drive (SSD) 3000, according to some example embodiments of the inventive concepts.

As illustrated in FIG. 12, the SSD 3000 may include a plurality of non-volatile memory (NVM) devices 3200 and a controller 3100 connected to the non-volatile memory devices 3200 through a plurality of channels CH1 to CHn. The controller 3100 may perform operations as described above according to some example embodiments of the inventive concepts. For example, the controller 3100 may include a security key storing unit 3120, and may enable a security mode in response to a first command of a host. When the security mode is enabled, the controller 3100 may generate a security key based on a host key received from the host, and the generated security key may be stored in the security key storing unit 3120 in a volatile manner and be used for encryption and decryption of data.

As illustrated in FIG. 12, the controller 3100 may include the security key storing unit 3120, at least one processor 3140, a read-only memory (ROM) 3160, a buffer memory 3180, a host interface 3170, and a non-volatile memory interface 3190, each of which may be connected to a bus. The buffer memory 3180 may store data required for operations of the controller 3100. For example, the buffer memory 3180 may store a mapping table configured to store mapping information between a logical address and a physical address. The ROM 3160 may store a plurality of instructions that are executed by the at least one processor 3140. The host interface 3170 may function to interface with an external host of the SSD 3000. The non-volatile memory interface 3190 may function to interface with the non-volatile memory devices 3200.

Referring to FIG. 1, the least one processor 3140 of the controller 3100 may perform functions, which are performed by the control unit 1120, the security key generating unit 1130, and the data processing unit 1150 of FIG. 1, by executing the plurality of instructions. In addition, although the security key storing unit 3120 is illustrated in FIG. 12 as an independent element separated from the at least one processor 3140, the security key storing unit 3120 may be included inside the at least one processor 3140. When the SSD 3000 is separated from the host or power that is supplied from the host is shut off, a security key stored in the security key storing unit 3120 in a volatile manner may be automatically deleted.

Figure 13:
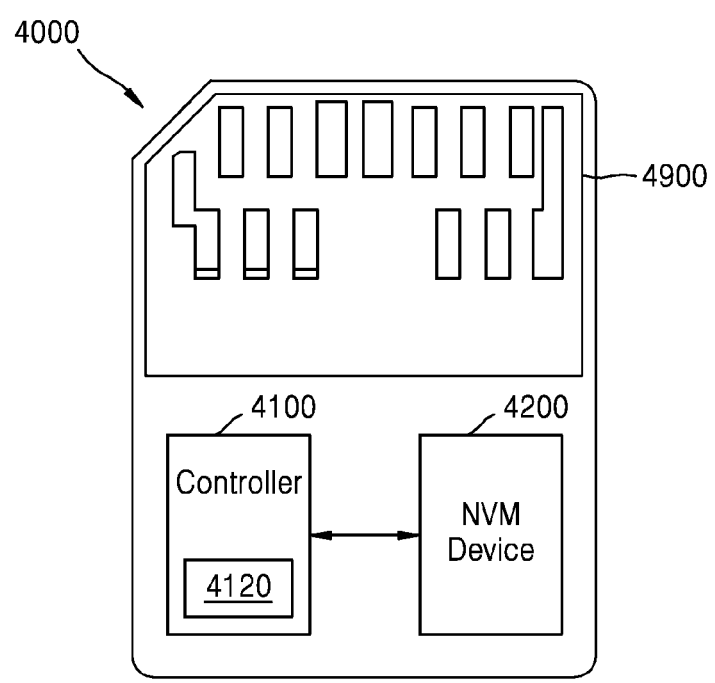
FIG. 13 is a diagram of a memory card, according to some example embodiments of the inventive concepts.

FIG. 13 is a diagram of a memory card 4000, according to some example embodiments of the inventive concepts. The memory card 4000 may be an example of a portable storage device that may be connected to an electronic device, such as a mobile device or a desk-top computer. The memory card 4000 may communicate with a host using various card protocols (e.g., unique factorization domain (UFD), multimedia card (MMC), secure digital (SD), mini-SD, or Micro-SD).

As illustrated in FIG. 13, the memory card 4000 may include a controller 4100, a non-volatile memory device 4200, and a port region 4900. The controller 4100 may include a security key storing unit 4120 that stores a security key generated based on a host key received from a host, and may perform operations of a memory controller, which are described above according to some example embodiments of the inventive concepts. For example, the controller 4100 may receive a first command from an external host through the port region 4900, and may enable a security mode. When the security mode is enabled, the controller 4100 may encrypt data received from the host, based on a security key stored in the security key storing unit 4120 in a volatile manner, and may store the encrypted data in the non-volatile memory device 4200, or may decrypt data stored in the non-volatile memory device 4200 and may transmit the decrypted data to the host through the port region 4900. Also, the controller 4100 may receive a second command from the host and may change a characteristic key stored in the controller 4100. When the memory card 4000 is separated from the host or power that is supplied from the host is shut off, a security key stored in the security key storing unit 4120 in a volatile manner may be automatically deleted.

Figure 14:
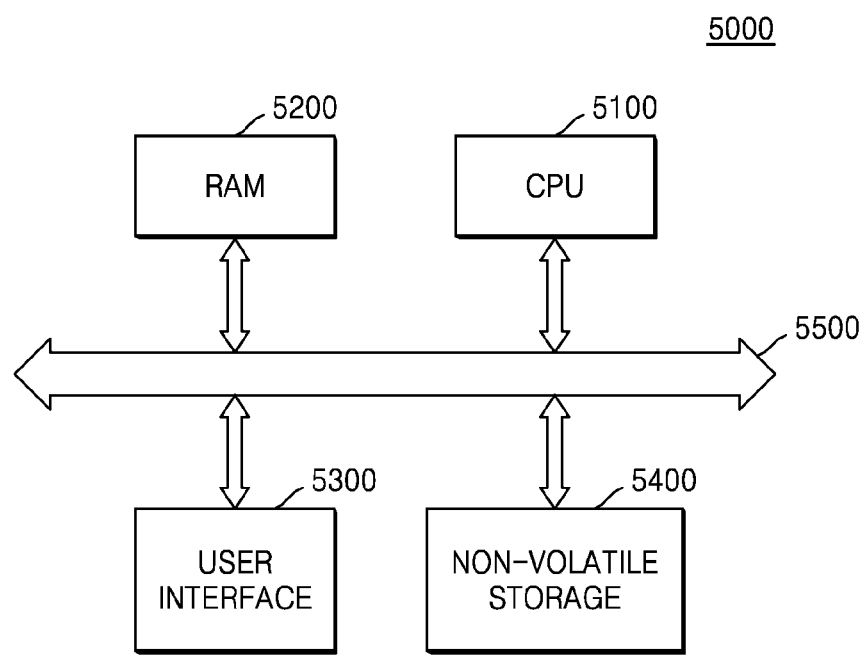
FIG. 14 is a diagram of a computing system including a non-volatile storage, according to some example embodiments of the inventive concepts.

FIG. 14 is a diagram of a computing system 5000 including a non-volatile storage 5400, according to some example embodiments of the inventive concepts. A memory system according to some example embodiments of the inventive concepts may be mounted as the non-volatile storage 5400 in the computing system 5000, such as a mobile device or a desk-top computer. The memory system, which is mounted as the non-volatile storage 5400, may include a memory controller and a non-volatile memory device, which are described above according to some example embodiments of the inventive concepts. For example, the memory controller included in the non-volatile storage 5400 may receive a first command through a bus 5500, and may enable a security mode. When the security mode is enabled, the memory controller may encrypt data received through the bus 5500, based on a security key stored in a security key storing unit in a volatile manner, and may store the encrypted data in the non-volatile memory device, or may decrypt data stored in the non-volatile memory device and may transmit the decrypted data to another element through the bus 5500. When the non-volatile storage 5400 is separated from the bus 5500 or power that is supplied to the non-volatile storage 5400 is shut off, a security key stored in the security key storing unit of the memory controller in a volatile manner may be automatically deleted.

The computing system 5000 according to some example embodiments of the inventive concepts may include a central processing unit (CPU) 5100, a RAM 5200, a user interface 5300, and a non-volatile storage 5400, each of which may be connected to a bus 5500. The CPU 5100 may generally control the computing system 5000. For example, the CPU 5100 may be an application processor (AP). The RAM 5200 may function as a data memory of the CPU 5100, and may be integrated with the CPU 5100 into a single chip using a System-on-Chip (SoC) technique or a Package-on-Package (PoP) technique. The user interface 5300 may receive input signals from a user or may output signals to the user via images and/or voices.

Algorithms for implementation or control of the memory controller and memory system technologies discussed in this application may be used for implementation or control of more general purpose apparatuses and/or methods of controlling apparatuses.

Methods for implementation or control of the memory controller and memory system technologies discussed in this application may be written as computer programs and can be implemented in general-use digital computers that execute the programs using a computer-readable recording medium. In addition, a structure of data used in the methods may be recorded in a computer-readable recording medium in various ways. Examples of the computer-readable recording medium include storage media such as magnetic storage media (e.g., ROM (Read-Only Memory), RAM (Random-Access Memory), USB (Universal Serial Bus), floppy disks, hard disks, etc.) and optical recording media (e.g., CD-ROMs (Compact Disc Read-Only Memories) or DVDs (Digital Video Discs)).

In addition, some example embodiments may also be implemented through computer-readable code/instructions in/on a medium (e.g., a computer-readable medium) to control at least one processing element to implement some example embodiments. The medium may correspond to any medium/media permitting the storage and/or transmission of the computer-readable code.

The computer-readable code may be recorded/transferred on a medium in a variety of ways, with examples of the medium including recording media, such as magnetic storage media (e.g., ROM, floppy disks, hard disks, etc.) and optical recording media (e.g., CD-ROMs or DVDs), and transmission media such as Internet transmission media. Thus, the medium may be such a defined and measurable structure including or carrying a signal or information, such as a device carrying a bitstream according to some example embodiments. The media may also be a distributed network, so that the computer-readable code is stored/transferred and executed in a distributed fashion. Furthermore, the processing element could include a processor or a computer processor, and processing elements may be distributed and/or included in a single device.

In some example embodiments, some of the elements may be implemented as a 'module'. According to some example embodiments, 'module' may be interpreted as software-based components or hardware components, such as a field programmable gate array (FPGA) or an application specific integrated circuit (ASIC), and the module may perform certain functions. However, the module is not limited to software or hardware. The module may be configured so as to be placed in a storage medium which may perform addressing, or to execute one or more processes.

For example, modules may include components such as software components, object-oriented software components, class components, and task components, processes, functions, attributes, procedures, subroutines, segments of program code, drivers, firmware, microcodes, circuits, data, databases, data structures, tables, arrays, and variables. Functions provided from the components and the modules may be combined into a smaller number of components and modules, or be separated into additional components and modules. Moreover, the components and the modules may execute one or more central processing units (CPUs) in a device.

Some example embodiments may be implemented through a medium including computer-readable codes/instructions to control at least one processing element of the above-described embodiments, for example, a computer-readable medium. Such a medium may correspond to a medium/media that may store and/or transmit the computer-readable codes.

The computer-readable codes may be recorded in a medium or be transmitted over the Internet. For example, the medium may include a ROM, a RAM, a CD-ROM, a magnetic tape, a floppy disc, an optical recording medium, or a carrier wave such as data transmission over the Internet. Further, the medium may be a non-transitory computer-readable medium. Since the medium may be a distributed network, the computer-readable code may be stored, transmitted, and executed in a distributed manner. Further, for example, the processing element may include a processor or a computer processor, and be distributed and/or included in one device.

It should be understood that the example embodiments described herein should be considered in a descriptive sense only and not for purposes of limitation. Descriptions of features or aspects within each embodiment should typically be considered as available for other similar features or aspects in other embodiments.

Although example embodiments have been shown and described, it would be appreciated by those skilled in the art that changes may be made in these example embodiments without departing from the principles and spirit of the disclosure, the scope of which is defined by the claims and their equivalents.

What is claimed is:

1. An operating method of a memory controller, the method comprising:
   determining if a command received from a host is a first command to enable a security mode;
   enabling the security mode in response to determining that the command received from the host is the first command;
   generating a security key based on a host key received from the host;
   storing the security key in a security key storing unit;
   performing a first data processing operation of encrypting data received from the host and decrypting data stored in a non-volatile memory device, based on the security key, when the security mode is enabled;
   monitoring power that is supplied to a memory system including the non-volatile memory device;
   generating an event signal in response to an abnormality of the power being sensed during the monitoring; and
   sanitizing the security key in the security key storing unit in response to the event signal,
   wherein the security key storing unit is a volatile memory.

2. The operating method of claim 1, wherein the generating of the security key comprises:
   reading a characteristic key from a characteristic key storing unit; and
   generating the security key based on the host key and the characteristic key,
   wherein the characteristic key storing unit is a non-volatile memory.

3. The operating method of claim 2, further comprising:
   performing a second data processing operation of encrypting data received from the host; and
   decrypting the data stored in the non-volatile memory device, based on the characteristic key, when the security mode is not enabled.

4. The operating method of claim 2, wherein the security key is generated by mapping the host key and the characteristic key to the security key based on a desired function, and
   wherein an entropy of the security key is greater than or equal to an entropy of each of the host key and the characteristic key.

5. The operating method of claim 2, further comprising:
   changing a value of the characteristic key stored in the characteristic key storing unit in response to a second command received from the host.

6. The operating method of claim 1, wherein the host key is received from the host together with the first command.

7. The operating method of claim 1, further comprising:
   transmitting a message, which requests the host key, to the host when the security mode is enabled.

8. An operating method of a memory controller that includes a volatile memory and a non-volatile memory, the method comprising:
   determining if a command received from a host is a first command to enable a security mode;
   enabling the security mode in response to determining that the command received from the host is the first command;
   generating a security key based on a host key received from the host;
   storing the security key in the volatile memory;
   encrypting data received from the host, based on the security key, when the security mode is enabled;
   monitoring power that is supplied to a memory system including the non-volatile memory;
   generating an event signal in response to an abnormality of the power being sensed during the monitoring; and
   sanitizing the security key in the volatile memory in response to the event signal.

9. The operating method of claim 8, further comprising:
   storing the encrypted data in the non-volatile memory.

10. The operating method of claim 8, wherein the generating of the security key comprises:
    reading a characteristic key from the non-volatile memory; and
    generating the security key based on the host key and the characteristic key.

11. The operating method of claim 10, further comprising:
    encrypting the data received from the host, based on the characteristic key, when the security mode is not enabled.

12. The operating method of claim 10, further comprising:
    decrypting data stored in the non-volatile memory, based on the characteristic key, when the security mode is not enabled.

13. The operating method of claim 10, further comprising:
    changing a value of the characteristic key in response to a second command received from the host.

14. An operating method of a memory controller that includes a volatile memory and a non-volatile memory, the method comprising:
    determining if a command received from a host is a first command to enable a security mode;
    enabling the security mode in response to determining that the command received from the host is the first command;
    generating a security key based on a host key received from the host;
    storing the security key in the volatile memory; and
    decrypting data stored in the non-volatile memory, based on the security key, when the security mode is enabled,
    monitoring power that is supplied to a memory system including the non-volatile memory;
    generating an event signal in response to an abnormality of the power being sensed during the monitoring; and sanitizing the security key in the volatile memory in response to the event signal.

15. The operating method of claim 14, further comprising:
encrypting data received from the host, based on the security key, when the security mode is enabled.

16. The operating method of claim 14, wherein the generating of the security key comprises:
reading a characteristic key from the non-volatile memory; and
generating the security key based on the host key and the characteristic key.

17. The operating method of claim 16, further comprising:
encrypting data received from the host, based on the characteristic key, when the security mode is not enabled.

18. The operating method of claim 16, further comprising:
decrypting the data stored in the non-volatile memory, based on the characteristic key, when the security mode is not enabled.

19. The operating method of claim 16, further comprising:
changing a value of the characteristic key in response to a second command received from the host.

* * * * *